July 5, 1938.  F. L. SCOTT  2,122,758

CUTTER SUPPORT FOR ROLLER DRILLS

Filed July 6, 1936

Floyd L. Scott
INVENTOR

BY Jesse R. Stone

ATTORNEY

Patented July 5, 1938

2,122,758

UNITED STATES PATENT OFFICE 2,122,758

CUTTER SUPPORT FOR ROLLER DRILLS

Floyd L. Scott, Houston, Tex., assignor to Hughes Tool Company, Houston, Tex., a corporation of Texas Application July 6, 1936, Serial No. 88,978

7 Claims. (Cl. 255—71)

This invention relates to the construction and mounting of the supports for roller cutters employed in well drilling. It pertains to the construction of the cross roller type of drill and other similar types.

In assembling the cutter shafts and the cutters thereon in the drill head, it is now common to weld the cutter shafts to the head. The welding operation results in heating the drill head and causes a distortion or warpage of the portion of the head supporting the shafts. Such distortion is frequently so great as to warp the drill head against the cutters and shafts and interfere with the free rolling of the cutters on the shafts.

It is an object of this invention to so construct the cutter supports that any distortion of the head in welding will not crowd or wedge the cutters tightly on the shafts and thus interfere with their rotation.

I desire to take up any thrust, due to inward contraction of the head in welding, by the cutter shafts themselves and prevent relative movement of the shaft and bridge.

I also aim to provide a simple type of cutter bearing upon the shaft which will not tend to lock, but will rotate freely, and effectively take the outward thrust on the cutters.

In the drawing herewith, Fig. 1 is a central longitudinal section through the head and side cutters of a cross roller bit employing my invention.

Figure 1:
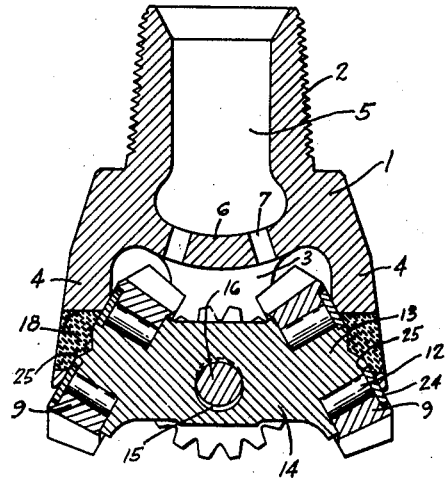

The drill shown is a cross roller drill having a head 1 with an upwardly tapered and threaded shank 2. The lower end of the head has two pairs of downwardly extending legs, 3, 3, and 4, 4. As will be seen the four legs partly enclose a lower recess or pocket in which are mounted the cutters. The shank 2 is formed with a recess or passage 5, the lower wall 6 of which has fluid discharging openings 7 and 8 arranged to discharge the flushing fluid most effectively upon the cutters.

The cutters include two side cutters 9 mounted with their upper ends inclined inwardly. There are also two cross roller cutters 10 and 11 which rotate on a horizontal axis transversely of the recess.

Figure 2:
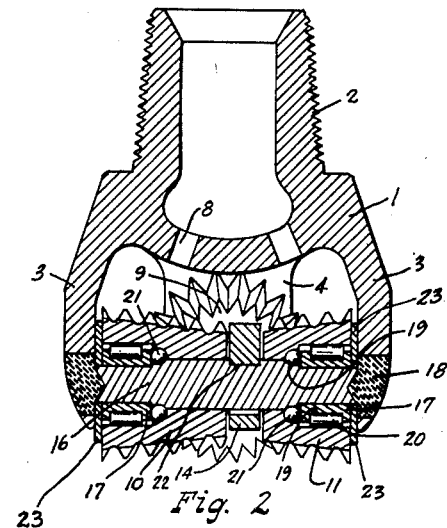
Fig. 2 is a similar section taken on a plane at right angles to that of Fig. 1.
Figure 3:
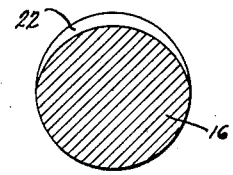
Fig. 3 is an enlarged detail transversely of an intermediate portion of the cross roller shaft.

The side cutters 9 are rotatable on roller bearings 12 mounted on short shafts 13 formed integrally upon the outer ends of a bridge member 14. Said bridge is flattened between said shafts 13 as will be seen in Fig. 2. The ends of the shafts 13 are slightly recessed to receive welding material. Midway of its ends the bridge has a transverse opening 15 to receive the cross roller shaft 16.

The cross roller shaft is reduced somewhat in outer diameter toward its ends to take a sleeve-like bushing 17, the inner end of which engages a shoulder on the shaft. Said bushing has an outer circumferential raceway to receive a row of rollers 20. The cutters 10 and 11 are similarly mounted on the shaft, the cutter 10 being longer than 11 to extend past the center of the hole and cut clearance for the bridge 14. Each cutter has an end recess internally of the cutter to fit over the bearing 20 and over a row of end thrust ball bearings 21 rolling in a raceway 19 in the shaft at the inner end of each bushing 17. As will be seen, the inner end of each cross roller cutter has a bearing directly on the shaft also.

The cross roller shaft extends through the opening 15 in the bridge and interlocks therewith. This interlocking is accomplished by cutting a curved notch or recess 22 in the upper side of said shaft at the point where it engages the bridge and then moving said shaft upwardly to engage the notch against the upper wall of the opening as will be obvious from the drawing.

To secure the assembled bridge, cross roller shaft and cutters in the head of the drill, the legs 3 and 4 are formed with openings therethrough where the ends of the shafts are to be secured. Washers 23 are placed over the ends of the cross roller shaft against the cutters and washers 24 are similarly mounted on the shafts 13. The assembly is then set up into position in the lower recess in the head and welding material is deposited in the openings in the legs to bond against the ends of the cutter shafts and the washers and thus secure the assembly in place, as illustrated.

When the legs are heated, as is the case while the welding is being done, they tend to contract inwardly against the shafts and may move the cutters and bearings so that they will lock and not rotate. The present construction avoids locking the cutters. The inward distortion of the legs 3 will engage the washers 23 and move the bushings 17 against the shoulders on the shaft. The shaft cannot move longitudinally because of the engagement with the bridge. Thus the cutters also are not locked. The inward contraction of the legs in cooling is taken by the washers 24 which engage a shoulder upon the outer end of each shaft 13.

It will be seen that this drill is of simple construction and, because of the formation and mounting of the cutter shafts, I am assured that the cutters will not be cramped by any distortion of the legs inwardly during the welding of the assembly in position.

What I claim is:

1. In a cross roller drill, a head having a cutter receiving recess at the forward end thereof, a bridge extending across said recess, shafts at the ends of said bridge, a cross roller shaft extending across said recess and through an opening transversely of said bridge, interfitting means on said shaft and bridge to engage said cross roller shaft detachably against longitudinal movement in the opening in said bridge, cutters on said shafts and means to weld the ends of said shafts to the inner walls of said recess.

2. In a cross roller drill, a head having a cutter receiving recess at the forward end thereof, a bridge extending across said recess, shafts at the ends of said bridge, a cross roller shaft extending across said recess and through an opening transversely of said bridge, a notch in said cross roller shaft adapted to engage the wall of said opening in said bridge to prevent relative longitudinal movement of said cross roller shaft in said opening, cutters on said shafts and means to weld said shafts to the walls of said recess.

3. In a cross roller drill, a head having a cutter receiving recess at the forward end thereof, a bridge extending across said recess, shafts at the ends of said bridge, a cross roller shaft extending across said recess and through an opening transversely of said bridge, means to engage said cross roller shaft detachably against longitudinal movement in the opening in said bridge, a bushing on said cross roller shaft, a shoulder on said cross roller shaft to limit the inward movement thereon of said bushing, a roller raceway in said bushing, rollers therein, washers on the ends of said cross roller shaft bearing against said bushings, cutters on said shafts and means to weld said shafts to the walls of said recess.

4. A cross roller drill, side cutters and cross roller cutters mounted thereon, a cross roller shaft for said cross roller cutters, said shaft being reduced in diameter toward its ends to form shoulders thereon, bushings on the reduced ends of said shaft and bearing against said shoulders, roller bearings on said bushings, said cross roller cutters fitting over said bearings, washers at the ends of said bushings on said shaft, side cutter shafts for said side cutters and means to weld said shafts and washers to said head.

5. A cross roller drill, side cutters and cross roller cutters mounted thereon, a cross roller shaft for said cross roller cutters, said shaft being reduced in diameter toward its ends to form shoulders thereon, bushings on the reduced ends of said shaft and bearing against said shoulders, roller bearings on said bushings, said cross roller cutters fitting over said bearings, a row of rolling bearings at the inner ends of said bushings, washers at the ends of said bushings on said shaft, side cutter shafts for said side cutters and means to weld said shafts and washers to said head.

6. A cross roller drill, side cutters and cross roller cutters mounted thereon, a cross roller shaft for said cross roller cutters, said shaft being reduced in diameter toward its ends to form shoulders thereon, bushings on the reduced ends of said shaft and bearing against said shoulders, roller bearings on said bushings, said cross roller cutters fitting over said bearings, means to prevent longitudinal movement of said cross roller shaft in said recess, washers at the ends of said bushings on said shaft, side cutter shafts for said side cutters and means to weld said shafts and washers to said head.

7. In a cross roller drill, a bridge and a cross roller shaft mounted in a recess in the forward end thereof, said cross roller shaft extending transversely through an opening in said bridge, said shaft having a notch therein engaging said bridge to prevent relative longitudinal movement of said shaft, cutters on said shaft and at the ends of said bridge, said shaft and bridge being welded to said head.

FLOYD L. SCOTT.